(12) United States Patent
Tofukuji

(10) Patent No.: US 9,840,999 B2
(45) Date of Patent: Dec. 12, 2017

(54) INTERNAL COMBUSTION ENGINE

(71) Applicant: Toyota Jidosha Kabushiki Kaisha, Toyota-shi Aichi-ken (JP)

(72) Inventor: Satoko Tofukuji, Minato-ku Tokyo-to (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/162,220

(22) Filed: May 23, 2016

(65) Prior Publication Data

US 2016/0356256 A1 Dec. 8, 2016

(30) Foreign Application Priority Data

Jun. 5, 2015 (JP) .................................. 2015-114964

(51) Int. Cl.
| | |
|---|---|
| *F02P 5/15* | (2006.01) |
| *F02P 5/152* | (2006.01) |
| *F01P 3/02* | (2006.01) |
| *F02D 35/02* | (2006.01) |

(52) U.S. Cl.
CPC .................. *F02P 5/152* (2013.01); *F01P 3/02* (2013.01); *F02P 5/1523* (2013.01); *F01P 2003/021* (2013.01); *F02D 35/027* (2013.01); *Y02T 10/46* (2013.01)

(58) Field of Classification Search
CPC .. F02P 5/152; F02P 5/1523; F01P 3/02; F01P 2003/021; Y02T 10/46; F02D 35/027
See application file for complete search history.

(56) References Cited

U.S. PATENT DOCUMENTS

| | | | | | |
|---|---|---|---|---|---|
| 4,471,736 | A | * | 9/1984 | Yoshida | F02P 5/1522 123/406.21 |
| 4,509,481 | A | * | 4/1985 | Nagumo | F01P 7/165 123/406.68 |
| 4,640,250 | A | * | 2/1987 | Hosaka | F02P 5/152 123/406.35 |
| 4,841,935 | A | * | 6/1989 | Yamada | F02D 41/0002 123/432 |
| 5,411,000 | A | * | 5/1995 | Miyashita | F02P 5/1504 123/406.35 |
| 5,417,191 | A | * | 5/1995 | Togai | F01L 1/267 123/333 |

(Continued)

FOREIGN PATENT DOCUMENTS

| | | | |
|---|---|---|---|
| JP | S55-057614 A | 4/1980 | |
| JP | S61-031390 U | 9/1987 | |

(Continued)

*Primary Examiner* — Joseph Dallo
(74) *Attorney, Agent, or Firm* — Dinsmore & Shohl LLP

(57) ABSTRACT

An HT cooling system cools at least a cylinder block with HT cooling water. An LT cooling system cools an intake port with LT cooling water that is at a lower temperature than the HT cooling water. A controller performs an ignition retard control that involves correcting the ignition timing based on the result of detection of a knock by a knock sensor, and a cooling enhancement control that involves enhancing cooling by the LT cooling system in the case where a knock is detected compared with the case where no knock is detected. The way of cooling by the HT cooling system is unchanged whether a knock is detected.

8 Claims, 14 Drawing Sheets

(56) References Cited

U.S. PATENT DOCUMENTS

| | | | |
|---|---|---|---|
| 2001/0050071 A1* | 12/2001 | Takahashi | F02D 35/021 |
| | | | 123/406.16 |
| 2002/0073964 A1* | 6/2002 | Franke | F02P 5/152 |
| | | | 123/406.33 |
| 2002/0092488 A1* | 7/2002 | Aoyama | F01L 13/0021 |
| | | | 123/90.16 |
| 2002/0144539 A1* | 10/2002 | Yorita | G01L 23/221 |
| | | | 73/35.08 |
| 2003/0150424 A1* | 8/2003 | Min | F02P 5/1502 |
| | | | 123/406.33 |
| 2006/0122765 A1* | 6/2006 | Nakao | G01L 23/225 |
| | | | 701/111 |
| 2007/0062488 A1* | 3/2007 | Kobayashi | F02D 35/027 |
| | | | 123/406.16 |
| 2009/0088957 A1 | 4/2009 | Yamada et al. | |
| 2014/0060485 A1* | 3/2014 | Ueno | F02D 41/0002 |
| | | | 123/344 |

FOREIGN PATENT DOCUMENTS

| | | |
|---|---|---|
| JP | 2008-215173 A | 9/2008 |
| JP | 2009-085161 A | 4/2009 |

* cited by examiner

INTERNAL COMBUSTION ENGINE

CROSS-REFERENCE TO RELATED APPLICATIONS

The present disclosure claims priority to Japanese Patent Application No. 2015-114964 filed Jun. 5, 2015, which is herein incorporated by reference in its entirety including the specification, drawings, and abstract.

FIELD

The present disclosure relates to an internal combustion engine that suppresses a knock by correcting an ignition timing and enhancing cooling with cooling water when a knock is detected.

BACKGROUND

JP 2009-085161 discloses an internal combustion engine provided with an electric water pump that makes cooling water circulate therein, wherein, when a knock (knocking) is detected, the ignition timing is retarded, and the electric water pump is controlled so that the internal combustion engine is more intensively cooled compared with the case where no knock is detected.

SUMMARY

According to the technique described in JP 2009-085161, the amount of retard of the ignition timing for suppressing a knock can be reduced owing to the knock reduction effect provided by the enhancement of the cooling with the cooling water. However, since this technique is not to selectively enhance cooling of the intake port and periphery thereof that have a particularly great influence on occurrence of knocks but to enhance cooling of the whole of the internal combustion engine including the cylinder block, the fuel consumption and the output power can deteriorate due to increase of cooling loss and friction loss.

Embodiments of the present disclosure have been devised in view of the problem described above, and an object of an embodiments of the present disclosure is to provide an internal combustion engine that can reduce or even eliminate of the occurrence of knocks without causing deterioration of fuel consumption and output power due to increase of cooling loss and friction loss.

An internal combustion engine according to the present disclosure comprises two cooling systems that use cooling water at different temperatures. One cooling system is a first cooling system that cools at least a cylinder block with a first cooling water. The other cooling system is a second cooling system that cools an intake port with a second cooling water that is at a lower temperature than the first cooling water.

The internal combustion engine according to the present disclosure further comprises a controller that is configured to detect a knock, to perform an ignition retard control, and to perform a cooling enhancement control. The ignition retard control involves retarding an ignition timing when a knock is detected and gradually reducing a retard amount for the ignition timing when no knock is detected. The cooling enhancement control that involves enhancing cooling by the second cooling system when a knock is detected compared with a case where no knock is detected. In the internal combustion engine according to the present disclosure, the way of cooling by the first cooling system is unchanged whether a knock is detected.

With the internal combustion engine configured as described above, the cylinder block or the like is cooled with cooling water at a relatively high temperature (first cooling water), and the intake port that has a great influence on the temperature of the intake air is cooled with cooling water at a relatively low temperature (second cooling water). The former helps to suppress an increase of cooling loss and friction loss, and the latter helps to reduce the occurrence of knocks. If a knock is detected, cooling by the second cooling system is enhanced by the cooling enhancement control compared with the case where no knock is detected. Therefore, the knock reduction effect of the cooling of the intake port can be improved, and the retard amount for the ignition timing involved in the ignition retard control can be reduced. The way of cooling of the cylinder block or the like is unchanged whether a knock is detected, so that cooling loss and friction loss can be prevented from increasing.

Occurrence of a knock is related to the operational region of the internal combustion engine, that is, the load and the engine speed. In an operational region where a knock has once occurred, even if the knock is reduced by the cooling enhancement control, a knock can occur again when the cooling enhancement control is terminated. In view of this, the controller may be configured to continue the cooling enhancement control until the operational region of the internal combustion engine changes. In other words, the controller may be configured to terminate the cooling enhancement control when the operational region of the internal combustion engine changes. With such a configuration, repetition of knocks can be prevented while avoiding uselessly performing the cooling enhancement control.

The second cooling system may comprise a radiator that cools the second cooling water and an electric water pump that makes the second cooling water circulate. In this case, the controller may be configured to make the electric water pump operate to maximize a flow rate of the second cooling water. With such a configuration, the amount of heat absorbed by the second cooling water can be increased to reduce the temperature of the intake port.

In this case, the controller may be configured to make the electric water pump operate to gradually reduce the flow rate of the second cooling water to a flow rate before the knock is detected in a case where the retard amount is reduced to a predetermined value (which may be zero). With such a configuration, the correction amount for the flow rate of the second cooling water with respect to the flow rate before the knock is detected can be minimized within the range where the knock is reduced.

The second cooling system may further comprise a temperature adjusting device that changes an inlet temperature of the second cooling water, which is the temperature of the second cooling water entering the internal combustion engine. In this case, the controller may be configured to make the temperature adjusting device operate to reduce the inlet temperature of the second cooling water in a case where a knock is detected when the flow rate of the second cooling water is already maximized. With such a configuration, the amount of heat absorbed by the second cooling water can be further increased to further reduce the temperature of the intake port.

In this case, the controller may be configured to make the temperature adjusting device operate to gradually increase the inlet temperature of the second cooling water to a temperature before the knock is detected when the retard amount is reduced to a predetermined value (which may be zero), and to make the electric water pump operate to gradually reduce the flow rate of the second cooling water to a flow rate before the knock is detected when the inlet temperature of the second cooling water is restored to the temperature before the knock is detected. With such a configuration, the correction amount for the inlet temperature of the second cooling water with respect to the temperature before the knock is detected can be minimized within the range where the knock is reduced. Furthermore, if it is allowed after the inlet temperature of the second cooling water is optimized, the correction amount for the flow rate of the second cooling water with respect to the flow rate before the knock is detected can be minimized within the range where the knock is reduced.

When changing the flow rate of the second cooling water by the cooling enhancement control, the controller may be configured to learn a setting of a parameter used to control the flow rate of the second cooling water for each operational region of the internal combustion engine. Besides, when changing the inlet temperature of the second cooling water by the cooling enhancement control, the controller may be configured to learn a setting of a parameter used to control the inlet temperature of the second cooling water for each operational region of the internal combustion engine. With such a configuration, when the operational region of the internal combustion engine changes, the flow rate or inlet temperature of the second cooling water can be optimized in advance, so that a knock can be prevented even in an operational region where a knock is likely to occur.

With the configuration described above, the cooling water that cools the cylinder block or the like and the cooling water that cools the intake port that has a great influence on the temperature of the intake air are set at different temperatures, so that the occurrence of knocks is reduced while suppressing increase of cooling loss and friction loss. In addition, when a knock is detected, cooling of the intake port is enhanced by the cooling enhancement control compared with when no knock is detected. Therefore, the knock reduction effect of the cooling of the intake port can be improved, and the retard amount for the ignition timing involved in the ignition retard control can be reduced. Meanwhile, the way of cooling of the cylinder block or the like is unchanged whether a knock is detected, so that cooling loss and friction loss can be prevented from increasing. The internal combustion engine according to the present disclosure can reduce the occurrence of knocks without causing deterioration of fuel consumption and output power due to increase of cooling loss and friction loss.

DESCRIPTION OF EMBODIMENTS

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessarily essential to embodiments of the present disclosure unless expressly stated or theoretically defined.

First Embodiment

1. Configuration of Internal Combustion Engine

Figure 1:
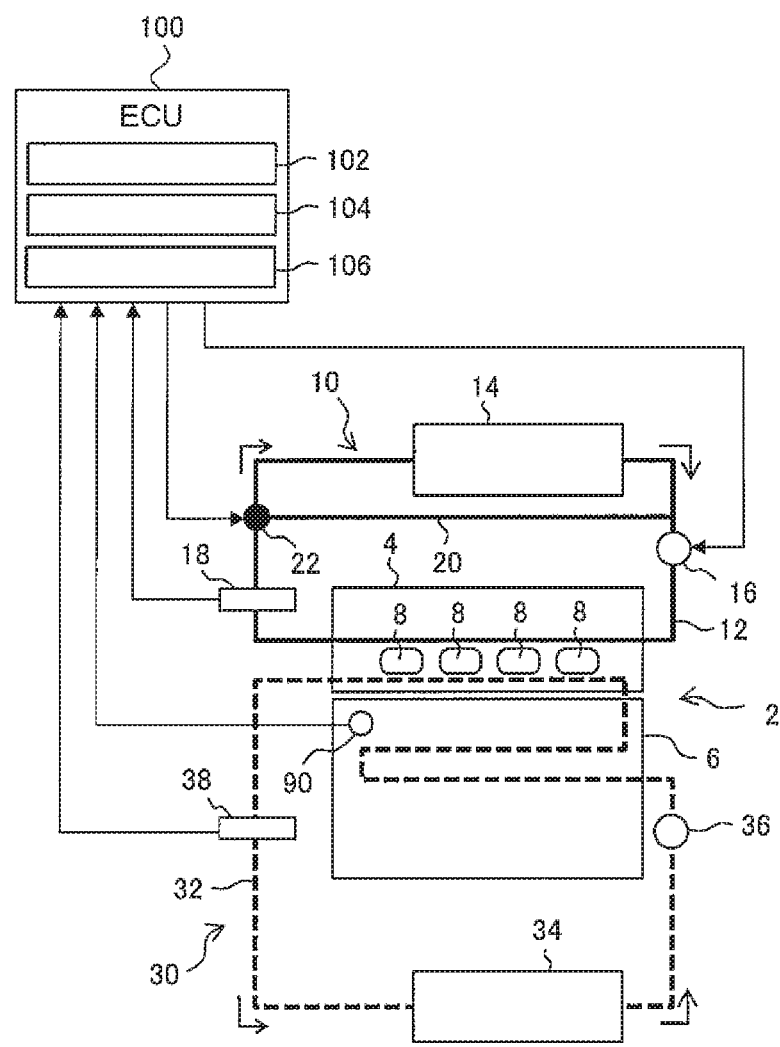
FIG. 1 is a schematic diagram showing a configuration of an internal combustion engine according to a first embodiment.

FIG. 1 is a schematic diagram showing a configuration of an internal combustion engine according to a first embodiment. An internal combustion engine 2 (referred to simply as an engine, hereinafter) according to this embodiment is provided with two water cooling systems 10 and 30 for cooling the engine 2 with cooling water flowing therein. The two cooling systems 10 and 30 are independent of each other and can use cooling water at different temperatures to cool the engine 2. In the following, the cooling system 10 that cools the engine 2 with cooling water at a lower temperature will be referred to as an "LT cooling system", and the cooling system 30 that cools the engine 2 with cooling water at a higher temperature will be referred to as a "HT cooling system". The cooling water flowing in the LT cooling system 10 will be referred to as "LT cooling water", and the cooling water flowing in the HT cooling system 30 will be referred to as "HT cooling water". "LT" is an abbreviation of low temperature, and "HT" is an abbreviation of high temperature.

The LT cooling system 10 is provided with an LT cooling water circulation circuit 12 in which the LT cooling water is circulated. The LT cooling water circulation circuit 12 includes a flow channel formed in a cylinder head 4 in the vicinity of an intake port 8, or more specifically, in the vicinity of an upper side of the intake port 8 and an intake valve. Intake air flows along the upper side of the intake port 8, and therefore, the temperature of the wall of the intake port 8, in particular, the temperature of the wall on the upper side of the intake port 8 is sensitive to a knock. In addition, the temperature of the intake valve, which is exposed to the intake air, is also sensitive to a knock. Therefore, a knock can be effectively reduced by intensively cooling the intake port 8 with the LT cooling water.

The LT cooling water circulation circuit 12 is provided with an LT radiator 14 that is a low temperature radiator and an LT water pump 16 for making the LT cooling water circulate. Assuming an inlet portion of the flow channel formed in the cylinder head 4 is a reference point, the LT radiator 14 is disposed upstream of the LT water pump 16 in the direction of circulation of the LT cooling water caused by the LT water pump 16. The LT water pump 16 is an electric water pump whose duty cycle is controlled. The flow rate of the LT cooling water circulated in the LT cooling water circulation circuit 12 can be adjusted by adjusting the duty cycle of the LT water pump 16.

The LT cooling water circulation circuit 12 is provided with a bypass channel 20 that bypasses the LT radiator 14. A three way valve 22 is provided at a branch point at which the bypass channel 20 branches from the cooling water circulation circuit 12. The three way valve 22 can change the ratio between the flow rate of the LT cooling water flowing to the LT radiator 14 and the flow rate of the LT cooling water flowing to the bypass channel 20. When the three way valve 22 is fully open, all the LT cooling water flows to the LT radiator 14. When the three way valve 22 is fully closed, all the LT cooling water flows to the bypass channel 20. When the three way valve 22 is partially open, the LT cooling water flows to both the LT radiator 14 and the bypass channel 20 in the ratio depending on the opening. The LT cooling water having passed through the LT radiator 14 is at a relatively low temperature, and the LT cooling water having passed through the bypass channel 20 is at a relatively high temperature. The temperature (inlet temperature) of the LT cooling water entering the engine 2 is adjusted by adjusting the opening of the three way valve 22.

An LT water temperature sensor 18 that measures the temperature of the LT cooling water having passed through the engine 2 is attached to the LT cooling water circulation circuit 12 at a point upstream of the three way valve 22. In this embodiment and the embodiments described later, the temperature of the LT cooling water (referred to as an "LT water temperature", hereinafter) means the outlet temperature of the LT cooling water measured by the LT water temperature sensor 18, unless otherwise specified.

The HT cooling system 30 is provided with an HT cooling water circulation circuit 32 in which HT cooling water is circulated. The HT cooling water circulation circuit 32 includes a flow channel formed in a cylinder block 6, and the flow channel forms a water jacket that surrounds the periphery of the cylinder. The HT cooling water circulation circuit 32 also includes a flow channel formed in the cylinder head 4, and the flow channel is provided to extend from the vicinity of an exhaust port to the vicinity of the intake port.

The HT cooling water circulation circuit 32 is provided with an HT radiator 34 that is a high temperature radiator and an HT water pump 36 that makes HT cooling water circulate. Assuming an inlet portion of the flow channel formed in the cylinder block 6 is a reference point, the HT radiator 34 is disposed upstream of the HT water pump 36 in the direction of circulation of the HT cooling water caused by the HT water pump 36. The HT water pump 36 is a mechanical water pump and is coupled to a crank shaft of the engine 2 by a belt.

An HT water temperature sensor 38 that measures the temperature of the HT cooling water having passed through the engine 2 is attached to the HT cooling water circulation circuit 32 at a point upstream of the HT radiator 34. In this embodiment and the embodiments described later, the temperature of the HT cooling water (referred to as an "HT water temperature", hereinafter) means the outlet temperature of the HT cooling water measured by the HT temperature sensor 38. Although it is known and therefore is not shown, the HT cooling water circulation circuit 32 is provided with a bypass channel that bypasses the HT radiator 34 and a thermostat, and the HT water temperature is automatically adjusted by the thermostat.

The engine 2 is provided with a controller 100 that controls the operation thereof. The controller 100 is an electronic control unit (ECU) that has at least an input/output interface, a ROM, a RAM, and a CPU. The input/output interface receives sensor signals from various sensors attached to the engine 2 or the vehicle and outputs operation signals to actuators provided in the engine 2. The sensors that provide signals to be received by the controller 100 include a knock sensor 90 attached to the cylinder block 6. The ROM stores various kinds of data including various control programs or maps used for controlling the engine 2. The controller 100 performs various functions by the CPU reading control programs from the ROM and executing the programs.

The items described above correspond to components of the disclosure set forth in the claims as follows: the HT cooling system 30 corresponds to a first cooling system, the HT cooling water corresponds to first cooling water, the LT cooling system 10 corresponds to a second cooling system, and the LT cooling water corresponds to second cooling water.

2. LT Cooling Water Temperature Control

Figure 2:
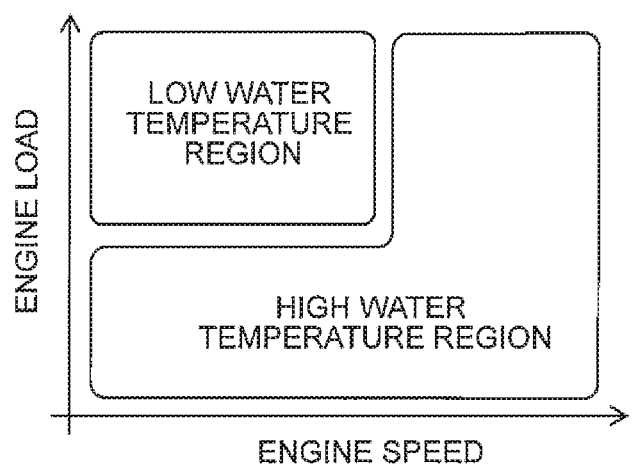
FIG. 2 is a conceptual diagram showing a map that associates a target LT water temperature with an engine load and an engine speed.

One of the functions performed by the controller 100 is to control the LT cooling water temperature to an appropriate temperature. The controller 100 sets a target LT water temperature, which is a target value of the LT cooling water temperature for cooling the intake port 8 and the periphery thereof to an appropriate temperature. In a map stored in the ROM of the controller 100, the target LT water temperature is associated with the operational state of the engine 2 that is determined by the engine load (charging efficiency can be used as a specific parameter that indicates the level of the engine load) and the engine speed. FIG. 2 is a conceptual diagram showing the map that associates the target LT water temperature with the engine load and the engine speed.

In this map, a low water temperature region and a high water temperature region are set. The low water temperature region is set in an operational region where the load is high and the engine speed is low. In the example shown in FIG. 2, the low water temperature region is an operational region where the engine load is higher than a certain value, and the engine speed is lower than a certain value. If the operating point of the engine 2 defined by the engine load and the engine speed lies in the low water temperature region, the target LT water temperature is set at a predetermined low temperature (45° C., in this example). Although the target LT water temperature in the low water temperature region is not limited to 45° C. shown as an example, temperatures close to 45° C. are suitable for suppressing occurrence of a knock.

The high water temperature region is set in an operational region other than the low water temperature region. In the example shown in FIG. 2, the high water temperature region is an operational region where the engine load is lower than the certain value or the engine speed is higher than the certain value. If the operating point of the engine 2 lies in the high water temperature region, the target LT water temperature is set at a predetermined high temperature (60° C., in this example). The target LT water temperature in the high water temperature region is not limited to 60° C. shown as an example. At temperatures close to 60° C., however, an increase of port wetting or destabilization of combustion due to excessive cooling can be prevented in the low load region or high speed region where the temperature of the intake port 8 and the periphery thereof tends to decrease.

The controller 100 controls the LT cooling system 10 in accordance with the target LT water temperature. More specifically, the controller 100 calculates a target flow rate of the LT cooling water by referring to prepared map that associates the target LT water temperature and the target flow rate of the LT cooling water and determines a duty cycle of the LT water pump 16 from the target flow rate of the LT cooling water. In addition, the controller 100 makes the three way valve 22 operate to adjust the inlet temperature of the LT cooling water so that the LT water temperature measured by the LT water temperature sensor 18 is equal to the target LT water temperature. The three way valve 22 corresponds to a temperature adjusting device according to the disclosure set forth in the claims.

3. Knock Reduction Control

The controller 100 performs a knock reduction control to reduce the occurrence of knocks of the engine 2. The knock reduction control is achieved by functions of the controller 100 as a knock detecting part 102, as an ignition retard controlling part 104, and as an LT cooling enhancement controlling part 106.

3-1. Knock Detection

The knock detecting part 102 of the controller 100 performs knock detection by processing a signal from a knock sensor 90 to calculate a knock intensity and comparing the knock intensity with a criterion value. According to a determination flow for knock detection (not shown), it is determined that a knock is detected when the knock intensity is equal to or greater than the criterion value, and it is determined that no knock is detected if the knock intensity is smaller than the criterion value. If the engine 2 is provided with a combustion pressure sensor, a signal from the combustion sensor can also be used for knock detection.

3-2. Ignition Retard Control

The ignition retard controlling part 104 of the controller 100 performs an ignition retard control based on the result of knock detection by the knock detecting part 102. If a knock is detected, the ignition retard control involves suppressing a knocking by retarding the ignition timing. If no knock is detected, the ignition retard control involves gradually reducing the retard amount for the ignition timing to advance the ignition timing as far as possible within the range where a knock can be suppressed to bring the ignition timing to MBT.

Figure 3:
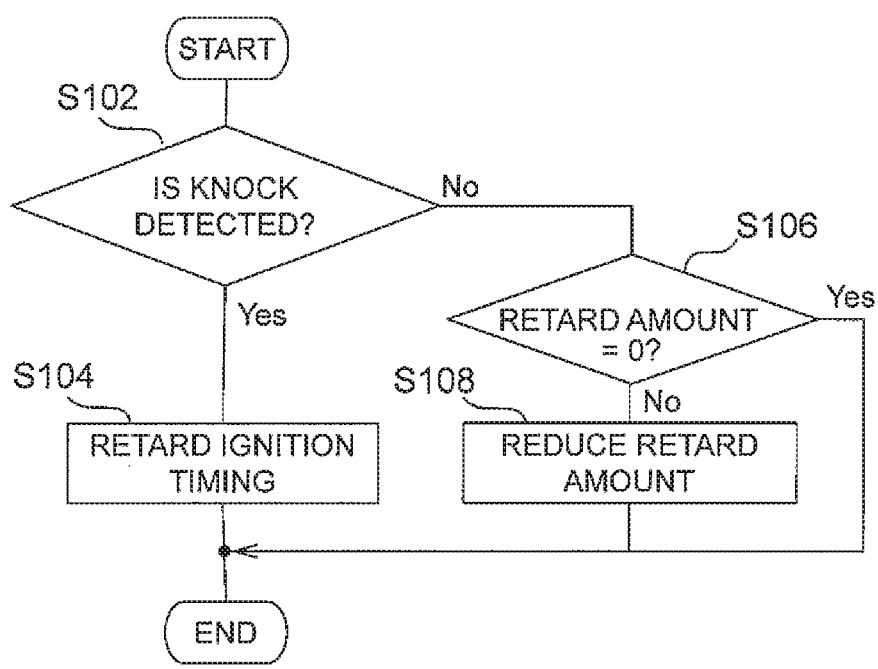
FIG. 3 is a flowchart showing a flow of an ignition retard control.

FIG. 3 is a flowchart showing a flow of the ignition retard control performed by the ignition retard controlling part 104. The ignition retard controlling part 104 is actualized in the controller 100 by repeatedly performing the routine shown by the flow at a predetermined control period that corresponds to the number of clocks of the ECU. In the following, specific processings of the ignition retard control will be described with reference to the flowchart.

In Step S102, the knock detecting part 102 of controller 100 determines whether or not a knock is detected. If a knock is detected, the flow proceeds to Step S104, where the ignition timing is retarded from MBT to reduce the knock. If no knock is detected, the flow proceeds to Step S106, where it is determined whether or not the retard amount for the ignition timing is zero. If the retard amount is not zero, the flow proceeds to Step S108, where the retard amount is decreased by a predetermined small amount. As the processing of Step S108 is repeated, the retard amount gradually decreases. If the retard amount is zero and the ignition timing is MBT, no processing is performed, and the ignition timing is maintained at MBT.

3-3. LT Cooling Enhancement Control

The LT cooling enhancement controlling part 106 of the controller 100 performs an LT cooling enhancement control based on the result of knock detection by the knock detecting part 102. If a knock is detected, the LT cooling enhancement control involves enhancing cooling by the LT cooling system 10 to reduce the temperature of the intake port 8 that has a great influence on the temperature of the intake air, compared with the case where no knock is detected. The HT water temperature of the HT cooling system 30 is automatically adjusted by the thermostat (no change is made to the temperature set in the thermostat), and the HT water pump 36 is driven by the engine 2, so that the way of cooling of the cylinder block 6 by the HT cooling system 30 is unchanged whether a knock is detected. In this way, the knock reduction effect by cooling of the intake port 8 can be enhanced without increasing the cooling loss or friction loss, and the retard amount for the ignition timing in the ignition retard control can be reduced.

Figure 4:
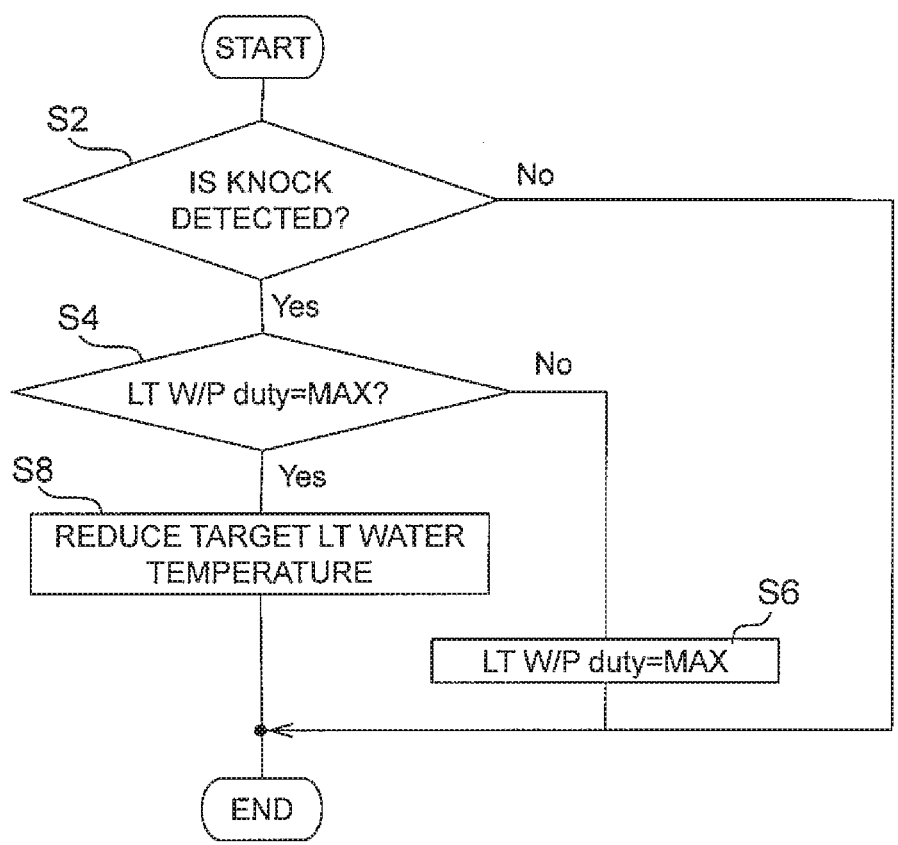
FIG. 4 is a flowchart showing a flow of an LT cooling enhancement control according to the first embodiment.

FIG. 4 is a flowchart showing a flow of the LT cooling enhancement control performed by the LT cooling enhancement controlling part 106. The LT cooling enhancement controlling part 106 is actualized in the controller 100 by repeatedly performing the routine shown by the flow at a predetermined control period that corresponds to the number of clocks of the ECU. In the following, specific processings of the LT cooling enhancement control will be described with reference to the flowchart.

In Step S2, the knock detecting part 102 of the controller 100 determines whether or not a knock is detected. If a knock is detected, the flow proceeds to Step S4, where it is determined whether or not the duty cycle (LT W/P duty) of the LT water pump 16 is already at a maximum value (MAX), that is, whether or not the flow rate of the LT cooling water is at the maximum.

If the duty cycle of the LT water pump 16 is not at the maximum value, the flow proceeds to Step S6, where the duty cycle of the LT water pump 16 is increased to the maximum value. By maximizing the flow rate of the LT cooling water flowing in the periphery of the intake port 8, the amount of heat absorbed by the LT cooling water is increased to reduce the temperature of the intake port 8.

Figure 5:
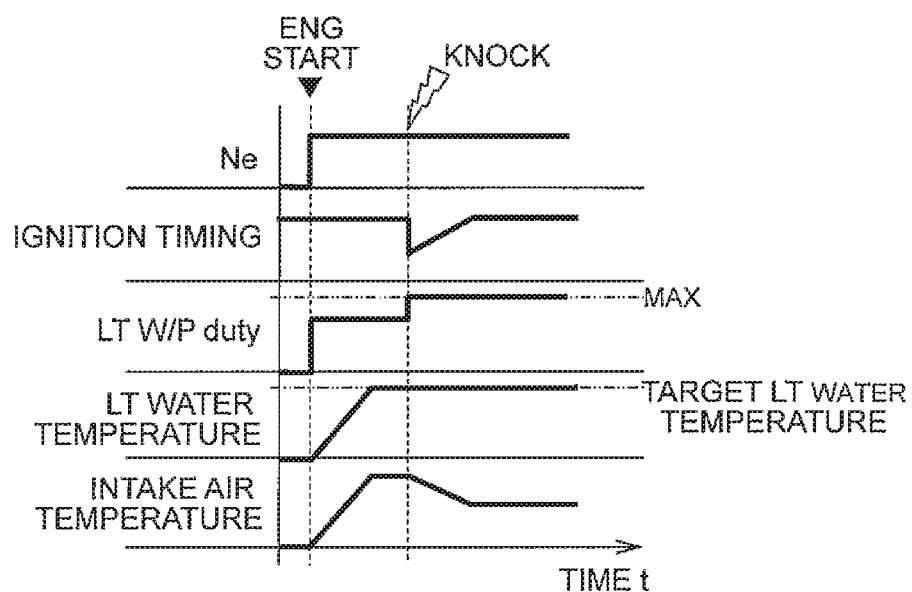
FIG. 5 is a time chart showing how state quantities change when a duty cycle of an LT water pump is increased to a maximum value by the LT cooling enhancement control according to the first embodiment.
Figure 6:
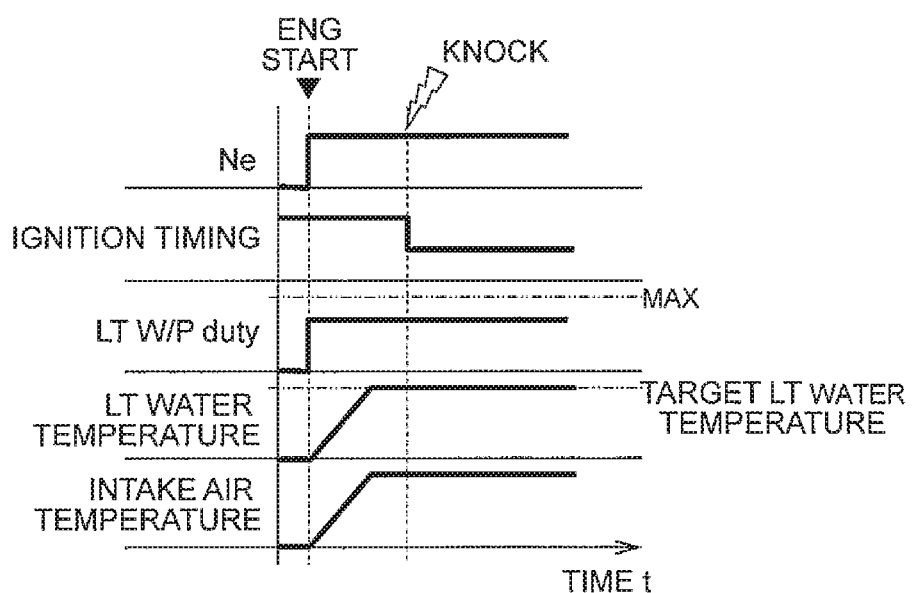
FIG. 6 is a time chart showing how the state quantities change when the duty cycle of the LT water pump is not changed in a comparative example.

FIG. 5 is a time chart showing how state quantities change when the duty cycle of the LT water pump 16 is maximized by the LT cooling enhancement control. FIG. 6 is a time chart showing how the state quantities change when the duty cycle of the LT water pump 16 is not changed in a comparative example of this embodiment. From top to down, the state quantities shown along the vertical axis of the time chart are engine speed, ignition timing, duty cycle of the LT water pump 16 (LT W/P duty), LT water temperature, and intake air temperature.

In the comparative example, as shown in FIG. 6, if a knock is detected, the ignition timing is retarded by the ignition retard control. The knock is suppressed by this operation, but the ignition timing is kept retarded. This is because, since the intake air temperature is kept high, a knock can occur again if the retard amount for the ignition timing is reduced. In the comparative example, since the ignition timing is kept retarded, the combustion efficiency decreases, and the fuel consumption deteriorates.

To the contrary, if the LT cooling enhancement control is performed, as shown in FIG. 5, when a knock is detected, the ignition timing is retarded by the ignition retard control, and at the same time, the duty cycle of the LT water pump 16 is increased to the maximum value (MAX). As a result, the amount of heat absorbed by the LT cooling water increases, the temperature of the intake port 8 decreases, the intake air temperature decreases, and the retard amount for the ignition timing can be gradually reduced accordingly. In addition, if the duty cycle of the LT water pump 16 is increased in a step-response manner to the maximum value, the wall temperature responsivity can be increased compared with the case where the duty cycle is gradually increased, and the ignition timing can be restored earlier. In this way, the LT cooling enhancement control can enhance the knock reduction effect of the cooling of the intake port 8 and reduce the retard amount for the ignition timing by the ignition retard control and therefore reduce the deterioration of the fuel consumption caused by retarding of the ignition timing.

Returning to the flowchart of FIG. 4, as a result of the duty cycle of the LT water pump 16 being increased to the maximum value in Step S6, the knock reduction effect of the cooling of the intake port 8 increases. If the knock detecting part 102 no longer detects any knock owing to this effect, the result of the determination in Step S2 is negative, and this control ends.

However, a knock can still be detected even if the duty cycle of the LT water pump 16 is increased to the maximum value. In such a case, the duty cycle of the LT water pump 16 is already at the maximum value, so that the flow proceeds to Step S8, where the target LT water temperature is reduced. For example, if the operating point of the engine 2 lies in the low water temperature region, the target LT water temperature is reduced from 45° C., the normal target value, to 40° C. Similarly, if a knock is detected when the operating point of the engine 2 lies in the high water temperature region, the target LT water temperature in the high water temperature region is reduced from 60° C., the normal target value, to a lower temperature. As the target LT water temperature is reduced, the opening of the three way valve 22 is changed to reduce the inlet temperature of the LT cooling water entering the engine 2. As a result, the difference in temperature between the LT cooling water flowing in the periphery of the intake port 8 and the wall surface of the flow channel increases. Therefore, even if the flow rate of the LT cooling water cannot be further increased, the amount of heat absorbed by the LT cooling water can be increased to further reduce the temperature of the intake port 8.

Figure 7:
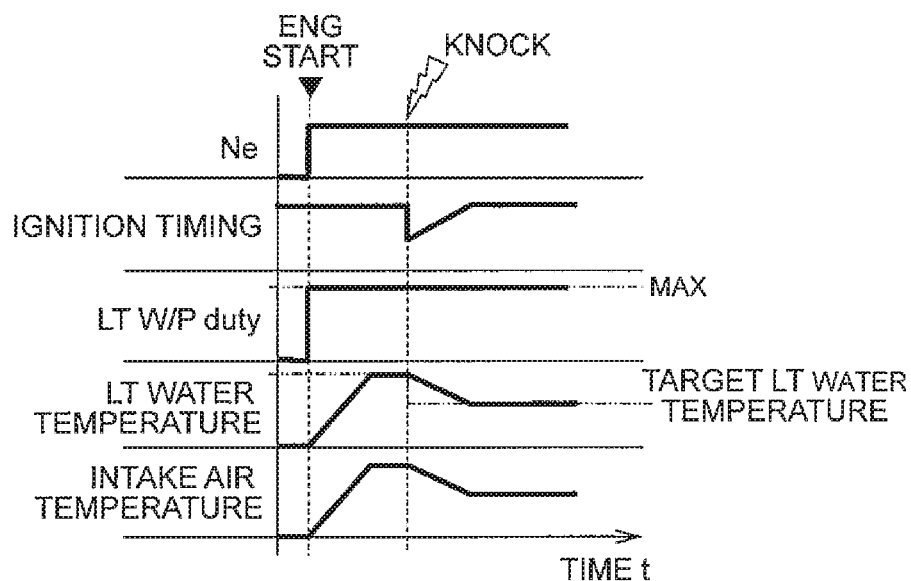
FIG. 7 is a time chart showing how state quantities change when a target LT water temperature is reduced by the LT cooling enhancement control according to the first embodiment.
Figure 8:
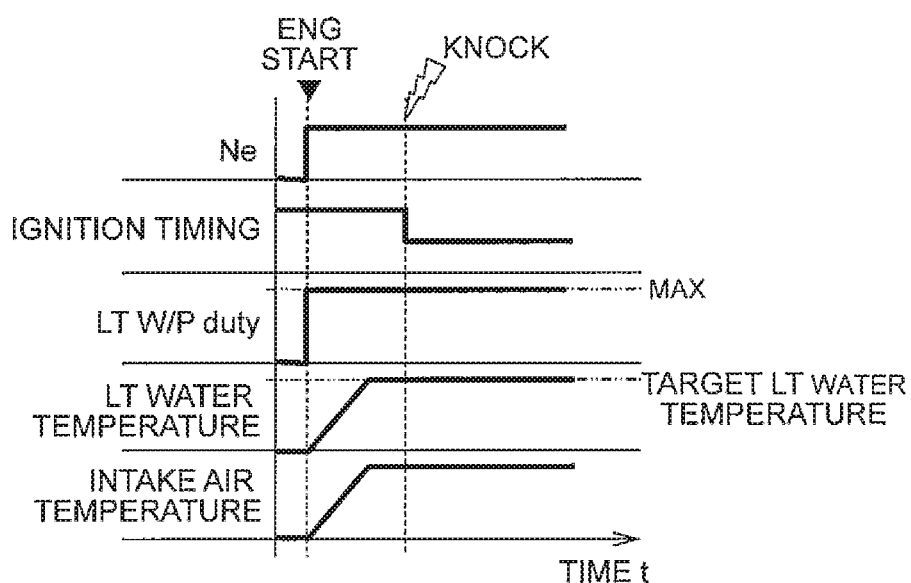
FIG. 8 is a time chart showing how the state quantities change when the target LT water temperature is not changed in a comparative example.

FIG. 7 is a time chart showing how state quantities change when the target LT water temperature is reduced by the LT cooling enhancement control. FIG. 8 is a time chart showing how the state quantities change when the target LT water temperature is not changed in a comparative example of this embodiment. From top to down, the state quantities shown along the vertical axis of the time chart are engine speed, ignition timing, duty cycle of the LT water pump 16 (LT W/P duty), LT water temperature, and intake air temperature.

In the comparative example, as shown in FIG. 8, if a knock is detected, the ignition timing is retarded by the ignition retard control. The knock is reduced by this operation, but the ignition timing is kept retarded. This is because, since the intake air temperature is kept high, a knock can occur again if the retard amount for the ignition timing is reduced. In the comparative example, since the ignition timing is kept retarded, the combustion efficiency decreases, and the fuel consumption deteriorates.

To the contrary, if the LT cooling enhancement control is performed, as shown in FIG. 7, when a knock is detected, the ignition timing is retarded by the ignition retard control, and at the same time, the target LT water temperature is reduced in a step-response manner. As a result, the LT water temperature gradually decreases, and the intake air temperature also decreases accordingly, so that the retard amount for the ignition timing can be gradually reduced accordingly. In addition, since the target LT water temperature is reduced in a step-response manner, the wall temperature responsivity can be increased compared with the case where the target LT water temperature is gradually reduced, and the ignition timing can be restored earlier. In this way, even when the duty cycle of the LT water pump 16 is already at the maximum value, the LT cooling enhancement control can enhance the knock reduction effect of the cooling of the intake port 8 and reduce the retard amount for the ignition timing by the ignition retard control and therefore reduce the deterioration of the fuel consumption caused by retarding of the ignition timing.

Returning to FIG. 4, as a result of the target LT water temperature being reduced to reduce the inlet temperature of the LT cooling water that cools the intake port 8 in Step S8, the knock reduction effect of the cooling of the intake port 8 increases. If the knock detecting part 102 no longer detects any knock owing to this effect, the result of the determination in Step S2 is negative, and this control ends.

Second Embodiment

As with the internal combustion engine according to the first embodiment, an internal combustion engine according to a second embodiment has the configuration shown in FIG. 1. The second embodiment differs from the first embodiment in processings of the LT cooling enhancement control performed.

In the LT cooling enhancement control according to the second embodiment, the enhancement of the cooling by the LT cooling system 10 continues until the operational region of the engine 2 changes. Occurrence of a knock is related to the operational region of the engine 2, that is, the engine load and the engine speed. In an operational region in which a knock has once occurred, even if the knock is suppressed by the enhancement of the cooling, a knock can occur again when the enhancement is terminated. In view of this, in the LT cooling enhancement control according to the second embodiment, the enhancement of cooling is terminated on the condition that the operational region of the engine 2 changes. In this way, repetition of knocks can be prevented while avoiding useless enhancement of the cooling by the LT cooling system 10.

Figure 9:
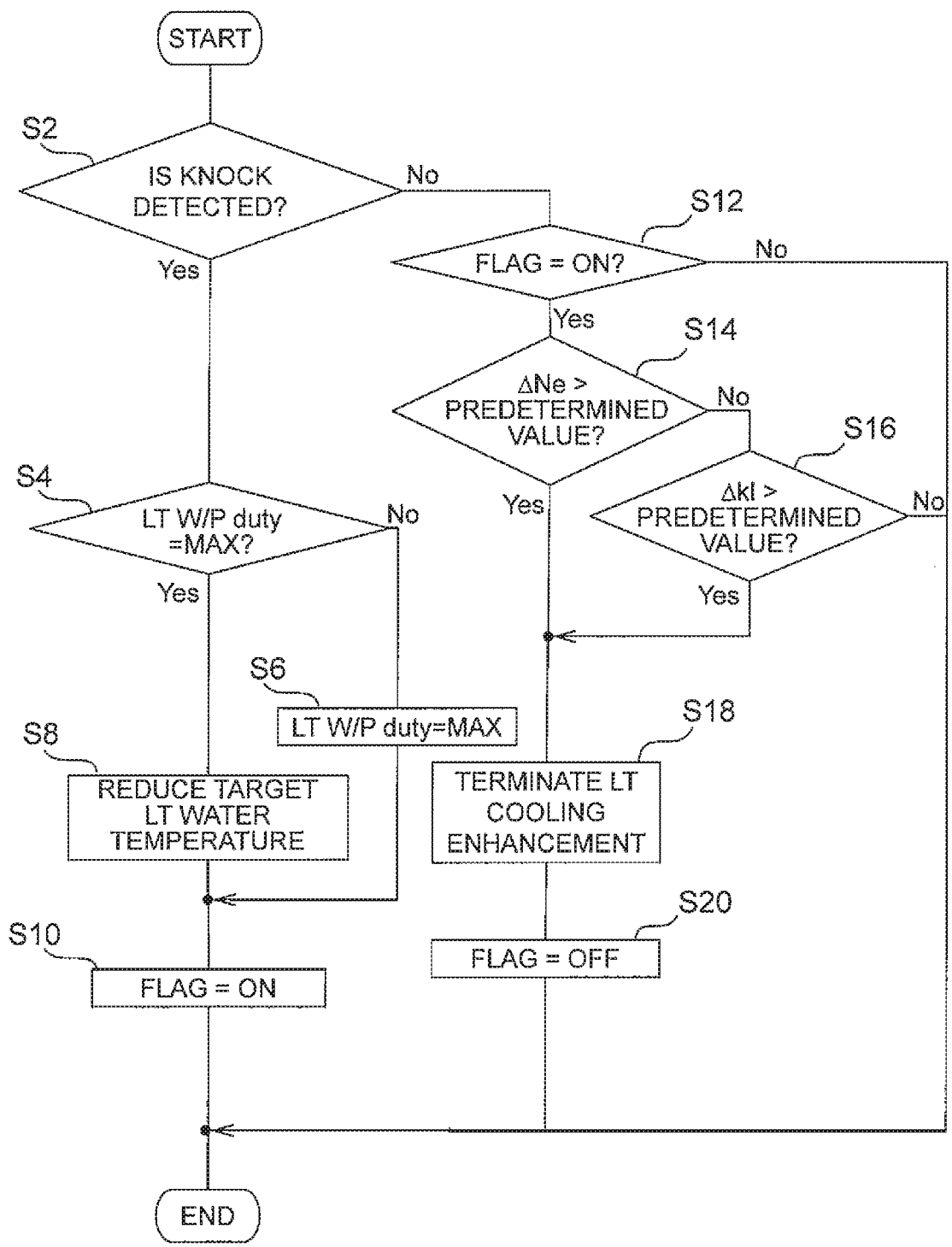
FIG. 9 is a flowchart showing a flow of an LT cooling enhancement control according to a second embodiment.

FIG. 9 is a flowchart showing a flow of the LT cooling enhancement control according to the second embodiment. The LT cooling enhancement controlling part 106 is actualized in the controller 100 by repeatedly performing the routine shown by the flow at a predetermined control period that corresponds to the number of clocks of the ECU. In the following, specific processings of the LT cooling enhancement control according to the second embodiment will be described with reference to the flowchart. Redundant descriptions of the same processings as those of the LT cooling enhancement control according to the first embodiment (in the flowchart, the same processings as those of the LT cooling enhancement control according to the first embodiment are denoted by the same step numbers) will be omitted, and only processings specific to the second embodiment will be described.

In the LT cooling enhancement control according to the second embodiment, after the duty cycle of the LT water pump 16 is increased to the maximum value in Step S6 or the target LT water temperature is reduced in Step S8, the flow proceeds to Step S10, where an LT cooling enhancement flag is set. The LT cooling enhancement flag indicates that the cooling by the LT cooling system 10 is being enhanced.

In the LT cooling enhancement control according to the second embodiment, if no knock is detected in Step S2, the flow proceeds to Step S12, where it is determined whether the LT cooling enhancement flag is set or not. If the LT cooling enhancement flag is set, and no knock is detected, the flow proceeds to Step S14, where it is determined whether or not the amount of change of the engine speed (ΔNe) is greater than a predetermined value. The amount of change of the engine speed used in this determination is the amount of change with respect to the engine speed at the time when the LT cooling enhancement flag is set. If the amount of change of the engine speed is equal to or smaller than the predetermined value, the flow proceeds to Step S16, where it is determined whether or not the amount of change of the engine load (ΔKL) is greater than a predetermined value. The amount of change of the engine load used in this determination is the amount of change with respect to the engine load at the time when the LT cooling enhancement flag is set. If the amount of change of the engine load is equal to or smaller than the predetermined value, this control ends.

If the amount of change of the engine speed is greater than the predetermined value, or if the amount of change of the engine load is greater than the predetermined value, it can be considered that the operating point of the engine 2 has moved out of the region where a knock is likely to occur. Then, the flow proceeds to Step S18, where the enhancement of the cooling by the LT cooling system 10 is finished. That is, if the target LT water temperature has been reduced, the target LT water temperature is restored to the normal target LT water temperature determined by the engine load and the engine speed. If the duty cycle of the LT water pump 16 has been increased to the maximum value, the duty cycle is restored to the normal duty cycle determined in response to the target LT water temperature.

In Step S20 that follows Step S18, the LT cooling enhancement flag is cleared. If the knock detecting part 102 detects no knock, and the LT cooling enhancement flag is cleared, the result of the determination in Step S12 is negative, and this control ends.

Third Embodiment

As with the internal combustion engine according to the first embodiment, an internal combustion engine according to a third embodiment has the configuration shown in FIG. 1. The third embodiment differs from the first and second embodiments in processings of the LT cooling enhancement control performed by the LT cooling enhancement controlling part 106.

In the LT cooling enhancement control according to the third embodiment, the duty cycle of the LT water pump 16 and the target LT water temperature are learned for each operational region of the engine 2 and are reflected in the subsequent control of the LT cooling system 10. The duty cycle of the LT water pump 16 is a parameter used for controlling the flow rate of the LT cooling water, and the target LT water temperature is a parameter used for controlling the inlet temperature of the LT cooling water. In this way, when the operational region of the engine 2 changes, the flow rate and inlet temperature of the LT cooling water can be optimized in advance, so that a knock can be prevented even in an operational region where a knock is likely to occur.

Figure 10:
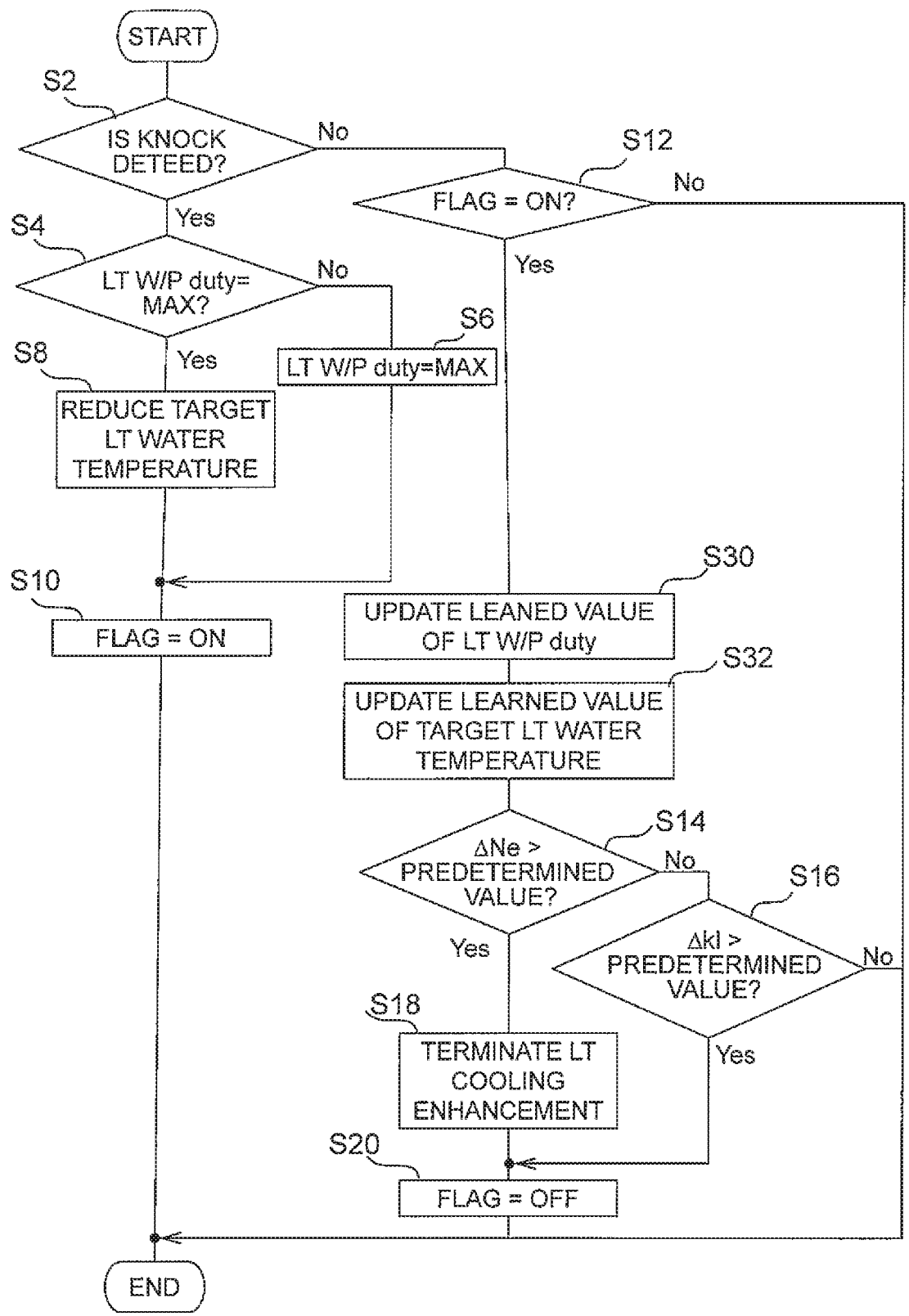
FIG. 10 is a flowchart showing a flow of an LT cooling enhancement control according to a third embodiment.

FIG. 10 is a flowchart showing a flow of the LT cooling enhancement control according to the third embodiment. The LT cooling enhancement controlling part 106 is actualized in the controller 100 by repeatedly performing the routine shown by the flow at a predetermined control period that corresponds to the number of clocks of the ECU. In the following, specific processings of the LT cooling enhancement control according to the third embodiment will be described with reference to the flowchart. Redundant descriptions of the same processings as those of the LT cooling enhancement control according to the second embodiment (in the flowchart, the same processings as those of the LT cooling enhancement control according to the second embodiment are denoted by the same step numbers) will be omitted, and only processings specific to the third embodiment will be described.

Figure 11:
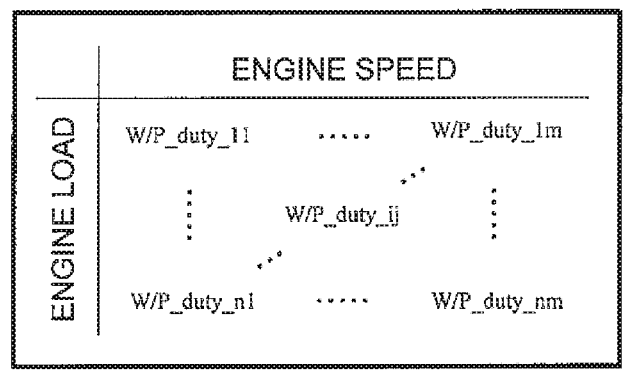
FIG. 11 shows a table that stores a learned value of the duty cycle of the LT water pump.

In the LT cooling enhancement control according to the third embodiment, if it is determined in Step S12 that the LT cooling enhancement flag is set, the flow proceeds to Step S30 before Step 14. In Step S30, the current duty cycle of the LT water pump 16 is stored as a learned value in a table. FIG. 11 shows an example of the table that stores the learned value of the duty cycle of the LT water pump 16. "W/P_duty_ij" in the table shown in FIG. 11 means a value of the duty cycle of the LT water pump 16 set in the case where the engine load corresponds to an index number "i", and the engine speed corresponds to an index number "j".

Figure 12:
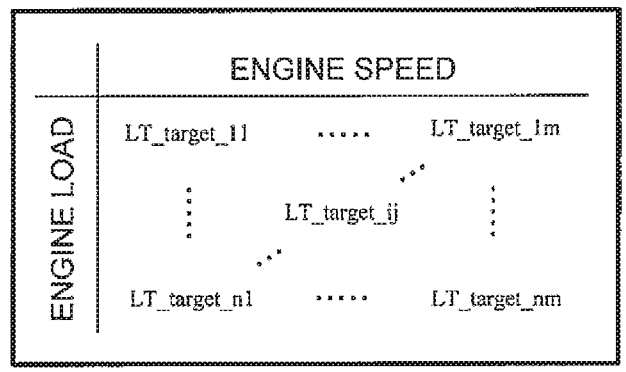
FIG. 12 shows a table that stores a learned value of the target LT water temperature.

The flow proceeds from Step S30 to Step S32. In Step S32, the current target LT water temperature is stored as a learned value in a table. FIG. 12 shows an example of the table that stores the learned value of the target LT water temperature. "LT_target_ij" in the table shown in FIG. 12 means a value of the target LT water temperature set in the case where the engine load corresponds to the index number "i", and the engine speed corresponds to the index number "j". Steps S30 and S32 are interchangeable.

Fourth Embodiment

As with the internal combustion engine according to the first embodiment, an internal combustion engine according to a fourth embodiment has the configuration shown in FIG. 1. The fourth embodiment differs from the first, second and third embodiments in processings of the LT cooling enhancement control performed by the LT cooling enhancement controlling part 106.

In the ignition retard control performed along with the LT cooling enhancement control, once a knock is suppressed by enhancement of the cooling by the LT cooling system 10, the retard amount is gradually reduced within the range where a knock can be reduced. In the LT cooling enhancement control according to the fourth embodiment, when the retard amount is reduced to zero by the ignition retard control, the duty cycle of the LT water pump 16 and the target LT water temperature are gradually restored to their original set values within the range where a knock can be suppressed.

More specifically, if the target LT water temperature has been reduced to suppress a knock, the target LT water temperature is gradually increased to the normal target value within the range where a knock can be suppressed. As the target LT water temperature is increased, the three way valve 22 operates to gradually increase the inlet temperature of the LT cooling water, and the inlet temperature of the LT cooling water gradually comes closer to the temperature before the knock is detected. Once the target LT water temperature is restored to the value set before the knock is detected, the duty cycle of the LT water pump 16 is gradually reduced to the normal duty cycle within the range where a knock can be suppressed. As the duty cycle of the LT water pump 16 is gradually reduced, the flow rate of the LT cooling water gradually comes closer to the flow rate before the knock is detected. In this way, the target LT water temperature and the duty cycle of the LT water pump 16 can be optimized.

Figure 13:
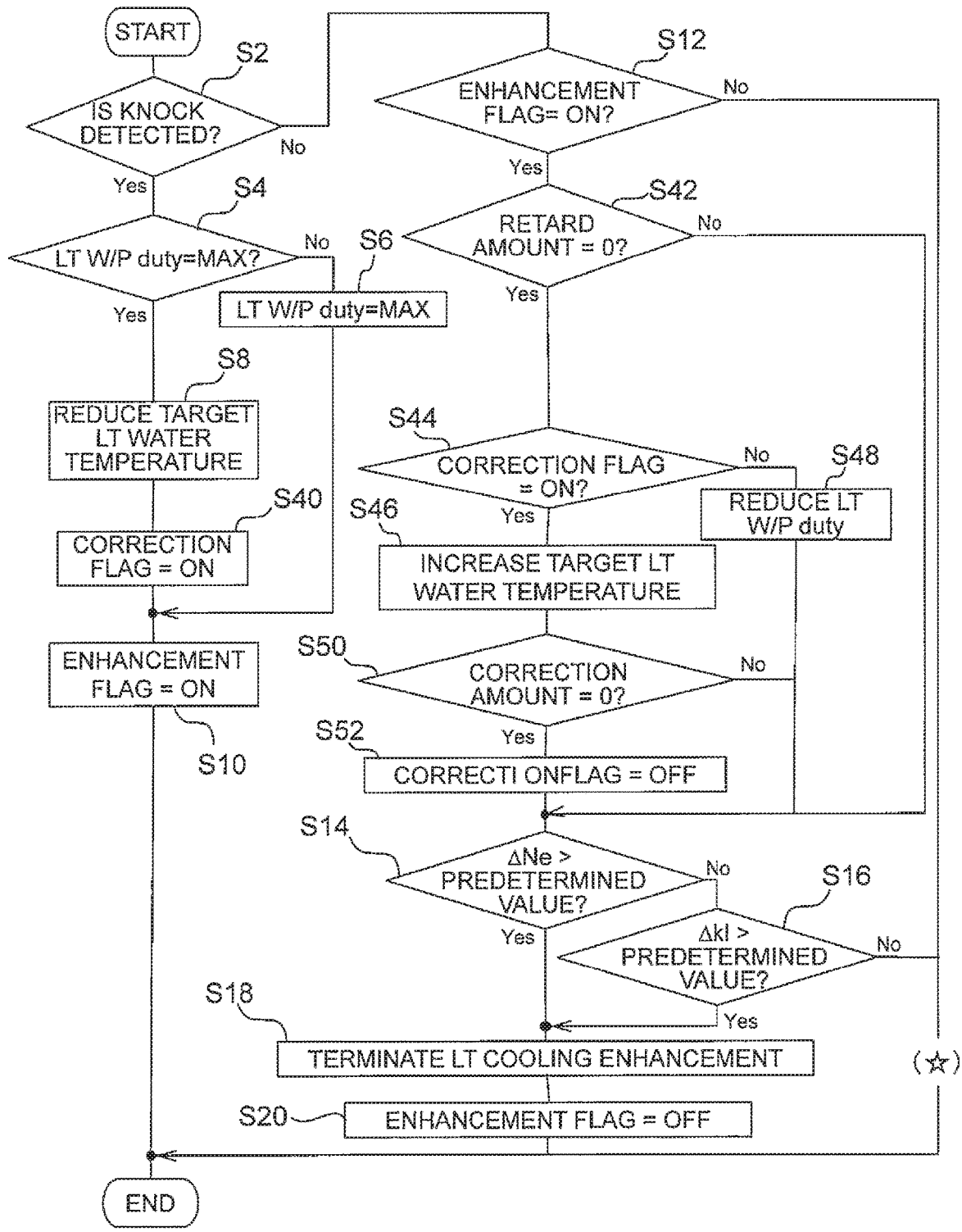
FIG. 13 is a flowchart showing a flow of an LT cooling enhancement control according to a fourth embodiment.

FIG. 13 is a flowchart showing a flow of the LT cooling enhancement control according to the fourth embodiment. The LT cooling enhancement controlling part 106 is actualized in the controller by repeatedly performing the routine shown by the flow at a predetermined control period that corresponds to the number of clocks of the ECU. In the following, specific processings of the LT cooling enhancement control according to the fourth embodiment will be described with reference to the flowchart. Redundant descriptions of the same processings as those of the LT cooling enhancement control according to the second embodiment (in the flowchart, the same processings as those of the LT cooling enhancement control according to the second embodiment are denoted by the same step numbers) will be omitted, and only processings specific to the fourth embodiment will be described.

In the LT cooling enhancement control according to the fourth embodiment, after the target LT water temperature is reduced in Step S8, the flow proceeds to Step S40, where a target LT water temperature correction flag is set. The target LT water temperature correction flag indicates that the target LT water temperature is being corrected. Following Step S40, or after the duty cycle of the LT water pump 16 is increased to the maximum value, the flow proceeds to Step S10, where the LT cooling enhancement flag is set.

In the LT cooling enhancement control according to the fourth embodiment, if it is determined in Step S12 that the LT cooling enhancement flag is set, the flow proceeds to Step S14 after Steps S42, S44, S46, S48, S50 and S52. In Step S42, it is determined whether or not the retard amount for the ignition timing is zero. If the retard amount has not been reduced to a predetermined value (this value can be zero as shown in FIG. 13), the flow proceeds to Step S14 by skipping the remaining Steps S44, S46, S48, S50 and S52.

If it is determined in Step S42 that the retard amount has been reduced to a predetermined value (zero in FIG. 13), the flow proceeds to Step S44, where it is determined whether or not the target LT water temperature correction flag is set. If the target LT water temperature correction flag is set, that is, the target LT water temperature is being corrected, the flow proceeds to Step S46, where the correction amount for the target LT water temperature is reduced by a predetermined amount. As the processing of Step S46 is repeated, the correction amount for the target LT water temperature is gradually reduced, and the target LT water temperature gradually increases to the normal target value determined by the engine load and the engine speed.

Following Step S46, the flow proceeds to Step S50, where it is determined whether or not the correction amount for the target LT water temperature is zero. If the correction amount for the target LT water temperature is zero, the flow proceeds to Step S52, where the target LT water temperature correction flag is cleared. If the correction amount for the target LT water temperature is not zero, the flow proceeds to Step S14 by skipping Step S52.

Once the target LT water temperature correction flag is cleared, the result of the determination in Step S44 is negative. If the result of the determination in Step S44 is negative, that is, the target LT water temperature is not being corrected (correction of the target LT water temperature is released), the flow proceeds to Step S48, where the correction amount for the duty cycle of the LT water pump 16 is gradually reduced by a predetermined amount. As the processing of Step S48 is repeated, the correction amount for the duty cycle of the LT water pump 16 is gradually reduced, and the duty cycle of the LT water pump 16 gradually decreases to the normal duty cycle determined by the target LT water temperature.

The processings of Steps S42, S44, S46, S48, S50 and S52 may be performed at the point shown by an asterisk in the flowchart, rather than between Steps S12 and S14.

Fifth Embodiment

As with the internal combustion engine according to the first embodiment, an internal combustion engine according to a fifth embodiment has the configuration shown in FIG. 1. The fifth embodiment differs from the first, second, third and fourth embodiments in processings of the LT cooling enhancement control performed by the LT cooling enhancement controlling part 106.

In the LT cooling enhancement control according to the fifth embodiment, once the retard amount is reduced to a predetermined value (zero in FIG. 13) by the ignition retard control, the duty cycle of the LT water pump 16 and the target LT water temperature are gradually restored to their normal set values within the range where a knock can be suppressed, and the duty cycle of the LT water pump 16 and the target LT water temperature are learned for each operational region of the engine 2 and are reflected in the subsequent control of the LT cooling system 10. In this way, when the operational region of the engine 2 changes, the flow rate and inlet temperature of the LT cooling water can be optimized in advance, so that a knock can be prevented even in an operational region where a knock is likely to occur.

Figure 14:
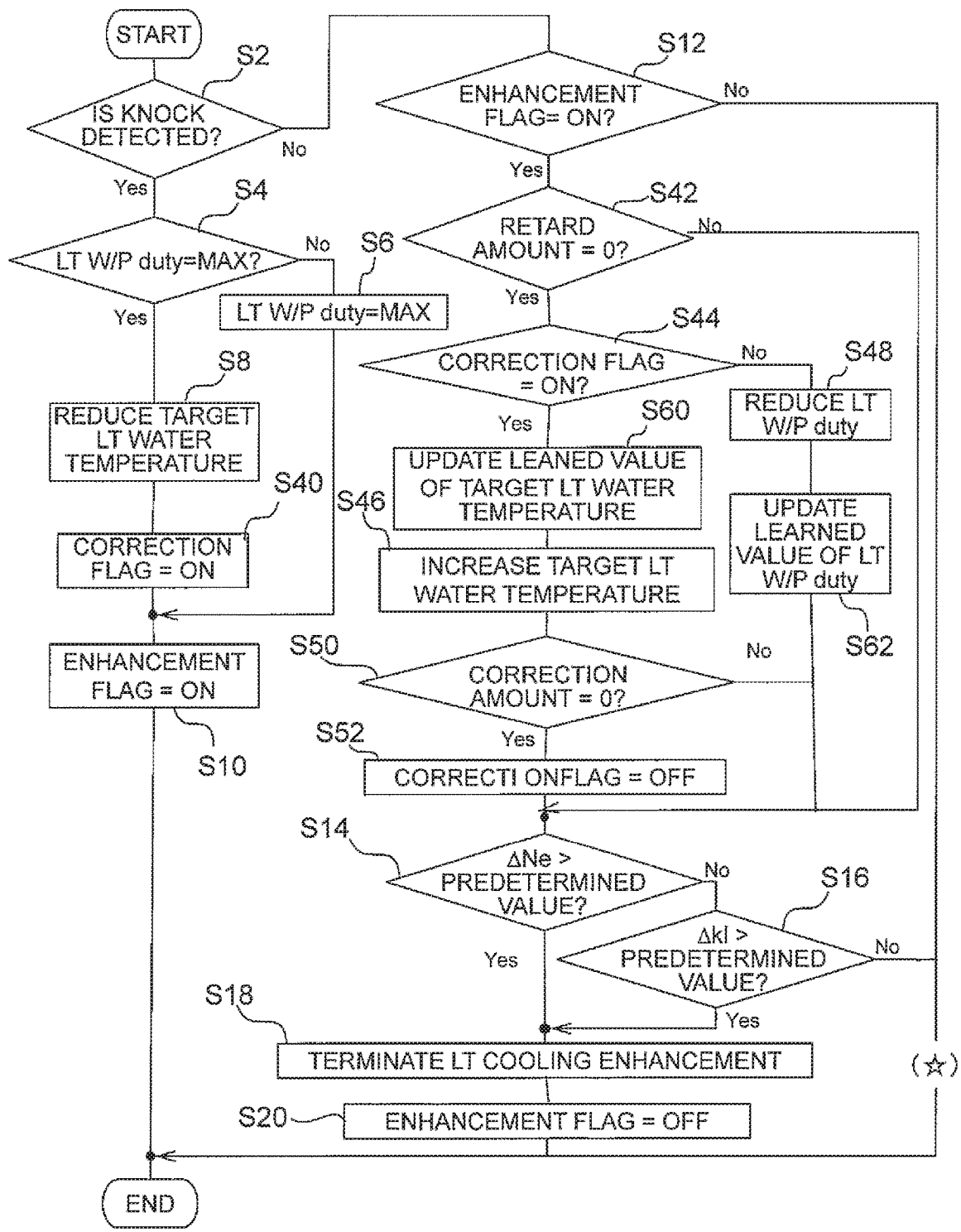
FIG. 14 is a flowchart showing a flow of an LT cooling enhancement control according to a fifth embodiment.

FIG. 14 is a flowchart showing a flow of the LT cooling enhancement control according to the fifth embodiment. The LT cooling enhancement controlling part 106 is actualized in the controller 100 by repeatedly performing the routine shown by the flow at a predetermined control period that corresponds to the number of clocks of the ECU. In the following, specific processings of the LT cooling enhancement control according to the fifth embodiment will be described with reference to the flowchart. Redundant descriptions of the same processings as those of the LT cooling enhancement control according to the fourth embodiment (in the flowchart, the same processings as those of the LT cooling enhancement control according to the fourth embodiment are denoted by the same step numbers)

will be omitted, and only processings specific to the fifth embodiment will be described.

In the LT cooling enhancement control according to the fifth embodiment, after the correction amount for the target LT water temperature is reduced by a predetermined amount in Step S46, the flow proceeds to Step S60 before Step S50. In Step S60, the current target LT water temperature is stored as a learned value in the table (see FIG. 12).

In the LT cooling enhancement control according to the fifth embodiment, after the correction amount for the duty cycle of the LT water pump 16 is reduced by a predetermined amount in Step S48, the flow proceeds to Step S62 before Step S14. In. Step S62, the current duty cycle of the LT water pump 16 is stored as a learned value in the table (see FIG. 11).

The processings of Steps S42, S44, S46, S48, S50, S52, S60 and S62 may be performed at the point shown by an asterisk in the flowchart, rather than between Steps S12 and S14.

Other Embodiments

Figure 15:
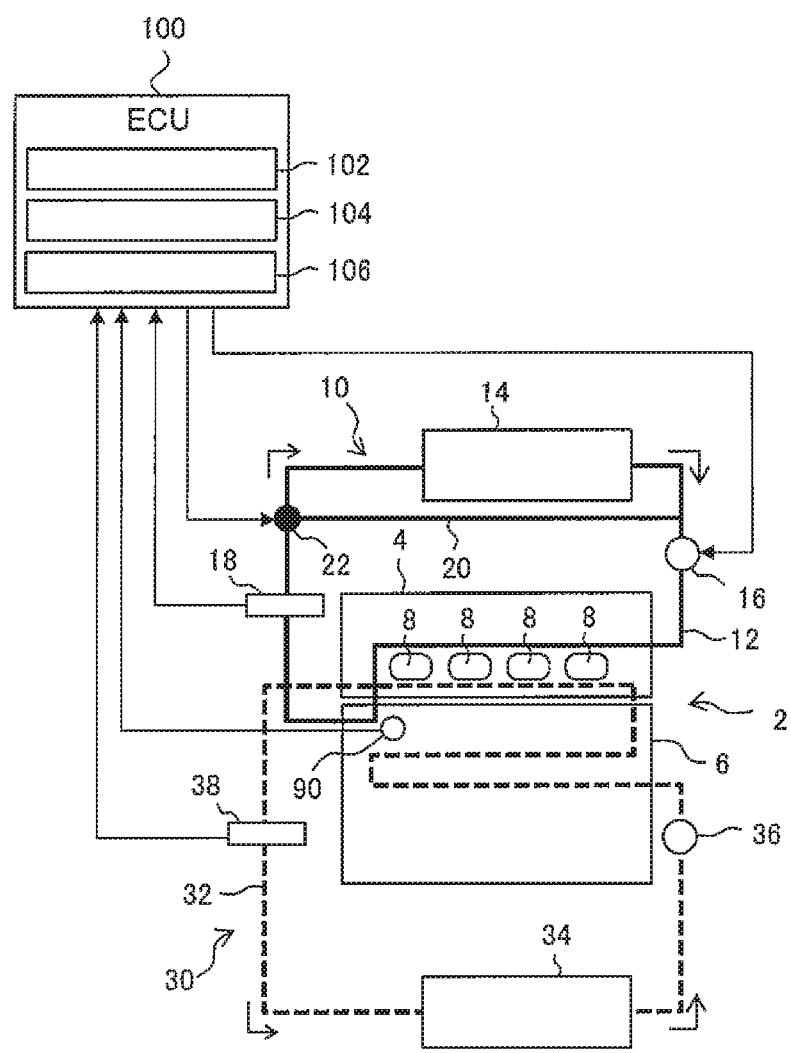
FIG. 15 is a schematic diagram showing a configuration of an internal combustion engine according to a first modification of the first embodiment.

FIG. 15 is a schematic diagram showing a configuration of an internal combustion engine according to a first modification of the first embodiment. As shown in FIG. 15, the LT cooling water circulation circuit 12 may be configured to extend from the cylinder head 4 into the cylinder block 6 and then exit from the cylinder block 6 to the outside of the engine 2. Such a configuration can be adopted if there is a restriction on the position of the outlet of the LT cooling water circulation circuit 12 from the engine.

Figure 16:
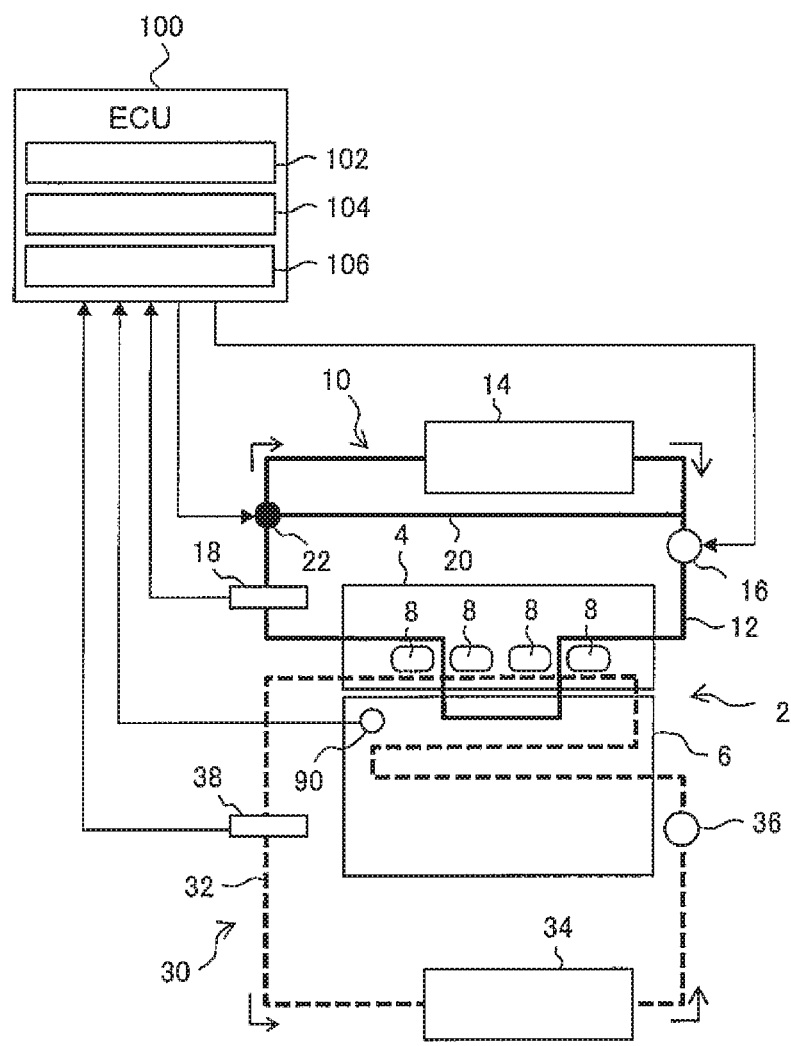
FIG. 16 is a schematic diagram showing a configuration of an internal combustion engine according to a second modification of the first embodiment.

FIG. 16 is a schematic diagram showing a configuration of an internal combustion engine according to a second modification of the first embodiment. As shown in FIG. 16, the LT cooling water circulation circuit 12 may be configured to extend from the cylinder head 4 into the cylinder block 6 and from the cylinder block 6 back into the cylinder head 4 and then exit from the cylinder head 4 to the outside of the engine 2. In this case, the flow channel formed in the cylinder block 6 is provided to surround a portion of the upper part of the cylinder that is particularly likely to be exposed to the flow of intake air. This is because the temperature of the wall of the upper part of the cylinder is highly sensitive to a knock, as with the temperature of the intake port 8. By cooling the upper part of the cylinder as well as the intake port 8 with the LT cooling water, occurrence of a knock can be effectively prevented.

Figure 17:
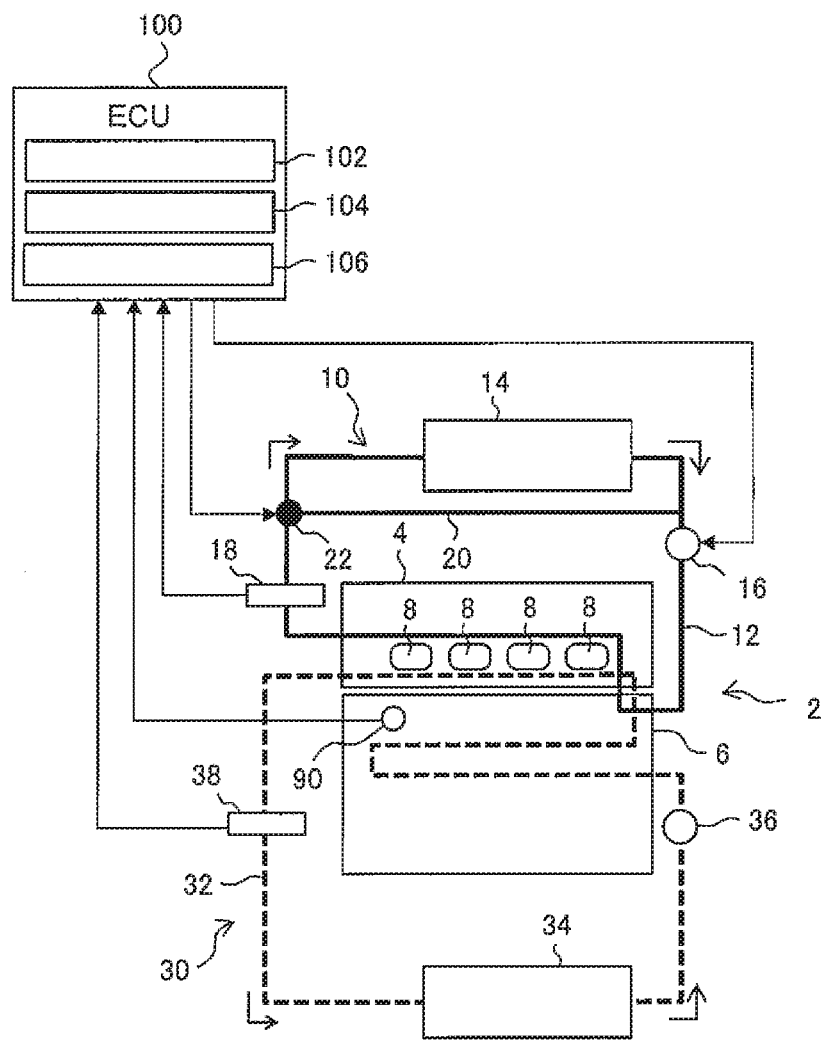
FIG. 17 is a schematic diagram showing a configuration of an internal combustion engine according to a third modification of the first embodiment.

FIG. 17 is a schematic diagram showing a configuration of an internal combustion engine according to a third modification of the first embodiment. As shown in FIG. 17, the LT cooling water circulation circuit 12 may be configured to enter the engine 2 at the cylinder block 6, extend from the cylinder block 6 into the cylinder head 4 and then exit from the cylinder head 4 to the outside of the engine 2. Such a configuration can be adopted if there is a restriction on the position of the inlet of the LT cooling water circulation circuit 12 into the engine.

Figure 18:
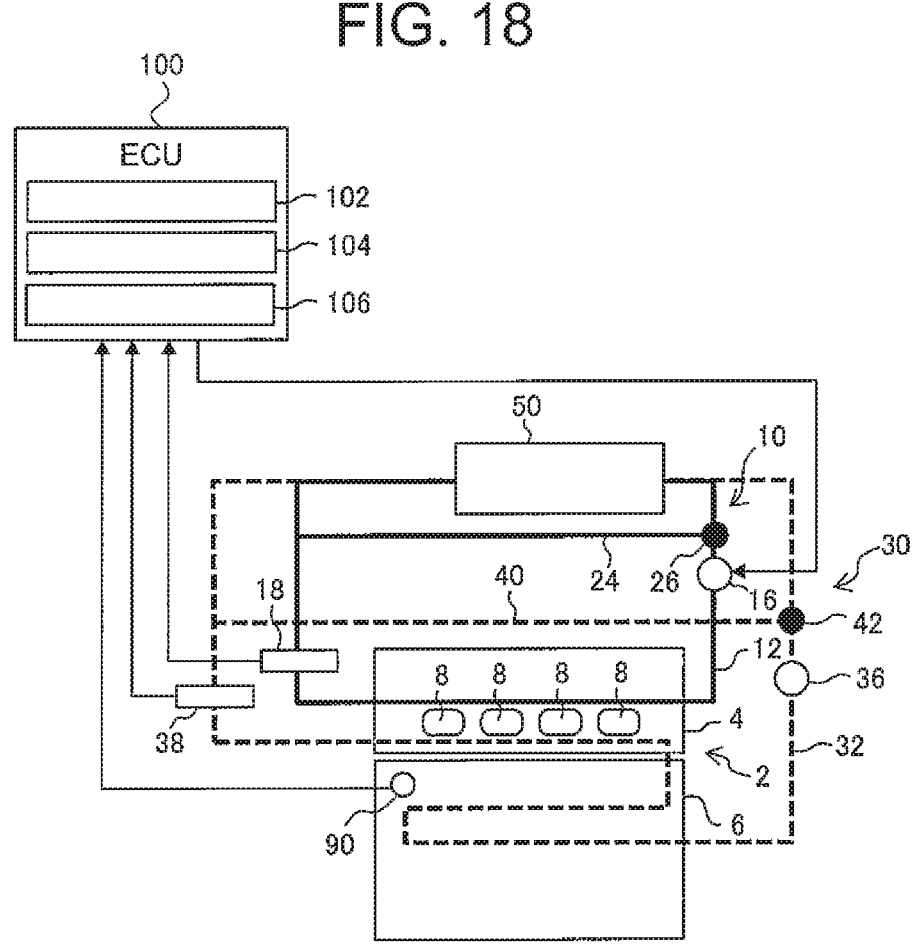
FIG. 18 is a schematic diagram showing a configuration of an internal combustion engine according to a fourth modification of the first embodiment.

FIG. 18 is a schematic diagram showing a configuration of an internal combustion engine according to a fourth modification of the first embodiment. According to the fourth modification, the LT cooling system 10 and the HT cooling system 30 share a single radiator 50. More specifically, the LT cooling water circulation circuit 12 and the HT cooling water circulation circuit 32 share a part of the cooling water channel, and the radiator 50 is provided on the shared part. The LT cooling water circulation circuit 12 is provided with a bypass channel 24 that bypasses the radiator 50. A variable-temperature thermostat 26 is provided on the LT cooling water circulation circuit 12 at the merging point at which the bypass channel 24 merges with the LT cooling water circulation circuit 12. The thermostat 26 corresponds to a temperature adjusting device of the disclosure set forth in the claims. The HT cooling water circulation circuit 32 is provided with a bypass channel 40 that bypasses the radiator 50. A thermostat 42 is provided on the HT cooling water circulation circuit 32 at the merging point at which the bypass channel 40 merges with the HT cooling water circulation circuit 32. With such a configuration, the HT cooling water and the LT cooling water can be set at different temperatures even though the LT cooling system 10 and the HT cooling system 30 share the radiator 50.

In the first embodiment and the modifications thereof, the HT water pump 36 may be an electric water pump. In that case, however, the duty cycle of the HT water pump 36 should be unchanged whether a knock is detected or not. That is, the way of cooling by the HT cooling system 30 is unchanged whether a knock is detected.

What is claimed is:
1. An internal combustion engine, comprising:
a first cooling system that cools at least a cylinder block with a first cooling water
a second cooling system that cools an intake port with a second cooling water that is at a lower temperature than the first cooling water; and
a controller which is configured
to detect a knock,
to perform an ignition retard control that involves retarding an ignition timing when a knock is detected, and gradually reducing a retard amount for the ignition timing when no knock is detected, and
to perform a cooling enhancement control that involves enhancing cooling by the second cooling system in a case where the knock detecting means detects a knock compared with a case where no knock is detected;
wherein the way of cooling by the first cooling system is unchanged whether a knock is detected.
2. The internal combustion engine according to claim 1, wherein the controller is configured to continue the cooling enhancement control until an operational region of the internal combustion engine changes.
3. The internal combustion engine according to claim 1, wherein the second cooling system comprises a radiator that cools the second cooling water and an electric water pump that makes the second cooling water circulate, and
the controller is configured to make the electric water pump operate to maximize a flow rate of the second cooling water.
4. The internal combustion engine according to claim 3, wherein the second cooling system further comprises a temperature adjusting device that changes an inlet temperature of the second cooling water, which is the temperature of the second cooling water entering the internal combustion engine, and
the controller is configured to make the temperature adjusting device operate to reduce the inlet temperature of the second cooling water in a case where a knock is detected when the flow rate of the second cooling water is already maximized.
5. The internal combustion engine according to claim 3, wherein the controller is configured to make the electric water pump operate to gradually reduce the flow rate of the second cooling water to a flow rate before the knock is detected when the retard amount is reduced to a predetermined value.

6. The internal combustion engine according to claim 4, wherein the controller is configured to make the temperature adjusting device operate to gradually increase the inlet temperature of the second cooling water to a temperature before the knock is detected when the retard amount is reduced to a predetermined value, and to make the electric water pump operate to gradually reduce the flow rate of the second cooling water to a flow rate before the knock is detected when the inlet temperature of the second cooling water is restored to the temperature before the knock is detected.

7. The internal combustion engine according to claim 3, wherein the controller is configured to learn a setting of a parameter used to control the flow rate of the second cooling water for each operational region of the internal combustion engine.

8. The internal combustion engine according to claim 4, wherein the controller is configured to learn a setting of a parameter used to control the inlet temperature of the second cooling water for each operational region of the internal combustion engine.

* * * * *

UNITED STATES PATENT AND TRADEMARK OFFICE
CERTIFICATE OF CORRECTION

PATENT NO.        : 9,840,999 B2
APPLICATION NO.   : 15/162220
DATED             : December 12, 2017
INVENTOR(S)       : Satoko Tofukuji It is certified that error appears in the above-identified patent and that said Letters Patent is hereby corrected as shown below:

In the Specification

In Column 15, Line 13, after "In", delete ".".

Signed and Sealed this
Twenty-sixth Day of June, 2018

Andrei Iancu
*Director of the United States Patent and Trademark Office*